(12) United States Patent
Morinaga et al.

(10) Patent No.: US 8,226,924 B2
(45) Date of Patent: Jul. 24, 2012

(54) METHOD FOR PRODUCING BOEHMITE PARTICLES AND METHOD FOR PRODUCING ALUMINA PARTICLES

(75) Inventors: Hitoshi Morinaga, Ichinomiya (JP); Muneaki Tahara, Ichinomiya (JP); Keiji Ashitaka, Kakamigahara (JP)

(73) Assignee: Fujimi Incorporated (JP)

( * ) Notice: Subject to any disclaimer, the term of this patent is extended or adjusted under 35 U.S.C. 154(b) by 35 days.

(21) Appl. No.: 12/542,852

(22) Filed: Aug. 18, 2009

(65) Prior Publication Data

US 2010/0040536 A1 Feb. 18, 2010

(30) Foreign Application Priority Data

Aug. 18, 2008 (JP) ................................. 2008-210027
Jul. 21, 2009 (JP) ................................. 2009-170196

(51) Int. Cl.
*C01F 7/02* (2006.01)
(52) U.S. Cl. .......................... 423/629; 423/127; 423/625
(58) Field of Classification Search .................. 423/625, 423/626, 627, 628, 629, 630
See application file for complete search history.

(56) References Cited

U.S. PATENT DOCUMENTS

| | | | |
|---|---|---|---|
| 5,194,243 A | 3/1993 | Pearson et al. | |
| 5,401,703 A * | 3/1995 | Fukuda | 501/153 |
| 5,641,469 A * | 6/1997 | Garg et al. | 423/625 |
| 6,403,007 B1 * | 6/2002 | Kido et al. | 264/234 |
| 7,638,105 B2 * | 12/2009 | Wang | 423/111 |
| 2004/0265219 A1 * | 12/2004 | Bauer et al. | 423/625 |

FOREIGN PATENT DOCUMENTS

| | | |
|---|---|---|
| EP | 0136512 A2 | 4/1985 |
| JP | 3-277683 A | 12/1991 |
| JP | 5-271647 A | 10/1993 |

OTHER PUBLICATIONS

Tsuchida, T.: "Hydro thermal synthesis of submicrometer crystals of boehmite"; Journal of the European Ceramic coviety, Elsevier Science Publishers, Barking, Essex, GB LNKD-DOI:10.1016/S0955-2219(00)00052-2, vol. 20, No. 11, Oct. 1, 2000, m oages 1759-1764, XP004214279 ISSN:0955-2219.

* cited by examiner

*Primary Examiner* — Stuart Hendrickson
*Assistant Examiner* — Richard M Rump
(74) *Attorney, Agent, or Firm* — Vidas, Arrett & Steinkraus, P.A.

(57) ABSTRACT

A method for producing boehmite particles includes subjecting powder of aluminum hydroxide to hydrothermal reaction together with a nucleation agent, thereby obtaining boehmite particles having an average primary particle size of 0.6 μm or less and including primary particles each having a hexahedral shape. A method for producing alumina particles includes: drying the boehmite particles produced by the above described method; calcining the boehmite particles, which have been dried, to obtain alumina particles; and disintegrating the obtained alumina particles.

13 Claims, No Drawings

METHOD FOR PRODUCING BOEHMITE PARTICLES AND METHOD FOR PRODUCING ALUMINA PARTICLES

BACKGROUND OF THE INVENTION

The present invention relates to a method for producing boehmite particles which can be used as a raw material for the production of alumina particles, and a method for producing alumina particles.

Alumina particles are used, for instance, as abrasive grains in an application of polishing an object to be polished, such as a semiconductor device substrate, a substrate for a display, a hard disk substrate, and a sapphire substrate for an LED. In order to obtain a polished surface with high smoothness and few defects, the particle size of the alumina particles to be used as abrasive grains is preferably as small as possible. A polishing composition which contains alumina particles as free abrasive grains generally has a higher removal rate (polishing rate) against the object to be polished than a polishing composition which contains colloidal silica as free abrasive grains. However, even in the case of a polishing composition containing alumina particles, the removal rate by the polishing composition against the object to be polished is not particularly high when the alumina particles have relatively small particle sizes. In addition, when the alumina particles have relatively small particle sizes, it is difficult to remove the alumina particles that have deposited on the polished surface (in other words, ease of washing off the alumina particles on the polished surface is not high).

As is described in Japanese Laid-Open Patent Publication No. 3-277683 and Japanese Laid-Open Patent Publication No. 5-271647, it is known to use alumina particles including primary particles each having an angular shape as abrasive grains. Alumina particles including primary particles each having a hexahedral shape, which are conceptually included in the angular alumina particles, are capable of polishing an object to be polished with a high removal rate and are easily washed from the surface of the object after polishing even when their particle sizes are relatively small. Accordingly, such alumina particles are suitable as abrasive grains in an application of polishing an object to be polished so as to obtain a polished surface with high smoothness and few defects.

SUMMARY OF THE INVENTION

Accordingly, an objective of the present invention is to provide a method suitable for producing alumina particles which can be used successfully as abrasive grains in an application of polishing an object to be polished so as to obtain a polished surface with high smoothness and few defects, and a method suitable for producing boehmite particles which are useful as a raw material for such alumina particles.

In order to achieve the above described objective, according to one aspect of the present invention, a method for producing boehmite particles is provided, which method includes subjecting powder of aluminum hydroxide to hydrothermal reaction together with a nucleation agent, thereby obtaining boehmite particles having an average particle size of 0.6 μm or less and including primary particles each having a hexahedral shape.

The powder of aluminum hydroxide to be used is preferably gibbsite. The nucleation agent to be used is preferably metal salt or sol of metal oxide.

The step of subjecting powder of aluminum hydroxide to hydrothermal reaction together with a nucleation agent is performed by subjecting, for instance, slurry containing the powder of aluminum hydroxide and the nucleation agent to the hydrothermal reaction. The pH of the slurry is preferably 8 or lower. The electrical conductivity of the slurry is preferably 500 μS/cm or lower.

The method for producing boehmite particles preferably further includes collecting, as filtrate, a water phase in slurry obtained as a result of the hydrothermal reaction and containing the boehmite particles while introducing pure water into the slurry and until the electrical conductivity of the collected filtrate becomes 50 μS/cm or lower.

According to another aspect of the present invention, a method for producing alumina particles is provided, which method includes: drying boehmite particles produced by the above described method; calcining the boehmite particles after having been dried to obtain alumina particles; and disintegrating the obtained alumina particles.

Other aspects and advantages of the invention will become apparent from the following description illustrating by way of example the principles of the invention.

DETAILED DESCRIPTION OF THE PREFERRED EMBODIMENTS

One embodiment of the present invention will now be described below.

At first, before a method for producing boehmite particles according to the present embodiment will be described, boehmite particles produced by the method according to the present embodiment will now be described. The main application of boehmite particles produced by the method according to the present embodiment is as a raw material for the production of alumina particles used as abrasive grains.

Boehmite particles produced by the method according to the present embodiment include primary particles each having a hexahedral shape. Each primary particle of the boehmite particles preferably has an outer shape similar to a parallelepiped defined by two square surfaces that face each other and four rectangular or square surfaces, or a parallelepiped defined by two rhombic surfaces that face each other and four rectangular or square surfaces. The shapes of the primary particles of alumina particles obtained by calcining boehmite particles usually inherit the almost shapes of the primary particles of the boehmite particles, so that it can be said that when boehmite particles including primary particles each having a hexahedral shape are used, alumina particles including primary particles each having a hexahedral shape are easily obtained. Alumina particles including primary particles each having a hexahedral shape are suitable as abrasive grains in an application of polishing an object to be polished so as to obtain a polished surface with high smoothness and few defects. Boehmite particles including primary particles each having a hexahedral shape are useful at least as a raw material for such alumina particles.

The primary particles of boehmite particles produced by the method according to the present embodiment have an average particle size of 0.6 μm or less. In other words, boehmite particles produced by the method according to the present embodiment have an average primary particle size of 0.6 μm or less. The average primary particle size of the boehmite particles is preferably 0.4 μm or less, more preferably 0.3 μm or less, and further preferably 0.2 μm or less. The average primary particle size of boehmite particles including primary particles each having a hexahedral shape is defined as an average length of sides each of which is the longest among three sides extending from one vertex of each primary particle of the boehmite particles. The value of the average primary particle size of alumina particles obtained by calcining boehmite particles usually inherits the almost value of the average primary particle size of the boehmite particles, so that it can be said that when boehmite particles having an average primary particle size in any of the above described ranges are used, alumina particles having an average primary particle size in the range are easily obtained. Alumina particles having an average primary particle size of 0.6 µm or less, or more specifically 0.4 µm or less, 0.3 µm or less, or 0.2 µm or less are suitable as abrasive grains in an application of polishing an object to be polished so as to obtain a polished surface with high smoothness and few defects. Boehmite particles having an average primary particle size of 0.6 µm or less, or more specifically 0.4 µm or less, 0.3 µm or less, or 0.2 µm or less are useful at least as a raw material for such alumina particles.

The average primary particle size of boehmite particles produced by the method according to the present embodiment is preferably 0.01 µm or more, more preferably 0.05 µm or more, further preferably 0.08 µm or more, and particularly preferably 0.1 µm or more. As described above, the value of the average primary particle size of alumina particles obtained by calcining boehmite particles usually inherits the almost value of the average primary particle size of the boehmite particles, so that it can be said that when boehmite particles having an average primary particle size in any of the above described ranges are used, alumina particles having an average primary particle size in the range are easily obtained. As the average primary particle size of alumina particles is larger, the removal rate (polishing rate) by the alumina particles against an object to be polished is enhanced. In this regard, when the average primary particle size of alumina particles is 0.01 µm or more, or more specifically 0.05 µm or more, 0.08 µm or more, or 0.1 µm or more, the removal rate is easily enhanced up to a level particularly suitable for practical use. Boehmite particles having an average primary particle size of 0.01 µm or more, or more specifically 0.05 µm or more, 0.08 µm or more, or 0.1 µm or more are useful at least as a raw material for such alumina particles.

The primary particles of boehmite particles produced by the method according to the present embodiment have an aspect ratio preferably in a range of 1 to 5, more preferably of 1 to 3, further preferably of 1 to 2, and particularly preferably of 1 to 1.5. The aspect ratio of boehmite primary particles each having a hexahedral shape is defined as an average of values each obtained by dividing a by c, where the length of the longest side is represented by a and the length of the shortest side is represented by c among three sides extending from one vertex of each boehmite primary particle. The length of the remaining one side b of each boehmite primary particle is preferably approximately equal to the length of the longest side a of the boehmite primary particle. The aspect ratio of the primary particles of alumina particles obtained by calcining boehmite particles usually inherits the almost aspect ratio of the primary particles of the boehmite particles, so that it can be said that when boehmite particles including primary particles having an aspect ratio in any of the above described ranges are used, alumina particles including primary particles having an aspect ratio in the range are easily obtained. Alumina particles including primary particles having an aspect ratio of 1 to 5, or more specifically 1 to 3, 1 to 2, or 1 to 1.5 are particularly suitable as abrasive grains in an application of polishing an object to be polished so as to obtain a polished surface with high smoothness and few defects. Boehmite particles including primary particles having an aspect ratio of 1 to 5, or more specifically 1 to 3, 1 to 2, or 1 to 1.5 are useful at least as a raw material for such alumina particles.

A method for producing boehmite particles according to the present embodiment includes using powder of aluminum hydroxide as a starting material and subjecting the powder to hydrothermal reaction. Powder of aluminum hydroxide suitable as the starting material is gibbsite.

Powder of aluminum hydroxide used as the starting material has an average primary particle size of preferably 10 µm or less. As the average primary particle size of powder of aluminum hydroxide is smaller, the efficiency of the hydrothermal reaction increases. In this regard, when the average primary particle size of powder of aluminum hydroxide is 10 µm or less, the efficiency of the hydrothermal reaction is easily enhanced up to a level particularly suitable for practical use.

Boehmite particles are produced (synthesized) by subjecting powder of aluminum hydroxide to hydrothermal reaction together with a nucleation agent. The nucleation agent refers to an auxiliary agent which forms micronuclei in water when subjected to hydrothermal reaction together with powder of aluminum hydroxide. The micronuclei formed by the nucleation agent act as nuclei, from which boehmite particles grow. A preferable nucleation agent is sol of metal oxide, or metal salt. Among them, alumina sol or aluminum nitrate (aluminum nitrate nonahydrate), which are the same aluminum compound as boehmite, are more preferable. However, when alumina sol is used as the nucleation agent, boehmite particles having small primary particle sizes are more easily obtained than the case of having used aluminum nitrate. In this point, alumina sol is particularly preferable.

Alumina sol used as the nucleation agent has an average particle size of preferably 5 to 30 nm, and more preferably 5 to 15 nm. When alumina sol having an average particle size in any of the above described ranges is used, the size of boehmite particles obtained is easily controlled. The average particle size of alumina sol is equal to the particle size of the last cumulative particle when the cumulative volume of particles in the alumina sol in order from the smallest particle becomes 50% or more of the total volume of all the particles in the alumina sol, and can be measured by using, for instance, a dynamic light scattering type nano-track particle size distribution measurement instrument (UPA series) made by NIKKISO CO., LTD.

Alumina sol used as the nucleation agent has a largest particle size of preferably 200 nm or less. When alumina sol having a largest particle size of 200 nm or less is used, the size of boehmite particles obtained is easily controlled. The largest particle size of alumina sol is equal to the particle size of the particle having the largest size in the alumina sol, and can be measured by using, for instance, AccuSizer model 780 made by Particle Sizing Systems.

The amount of a nucleation agent used in the hydrothermal reaction is preferably 0.000001 parts by weight or more, more preferably 0.00001 parts by weight or more, further preferably 0.0001 parts by weight or more, and particularly preferably 0.001 parts by weight or more when the amount of powder of aluminum hydroxide used in the hydrothermal reaction is 100 parts by weight. As the amount of a nucleation agent used increases, boehmite particles having small primary particle sizes are easily obtained. In this regard, when the amount of a nucleation agent used is 0.000001 parts by weight or more, or more specifically 0.00001 parts by weight or more, 0.0001 parts by weight or more, or 0.001 parts by weight or more if the amount of powder of aluminum hydroxide used is 100 parts by weight, boehmite particles having an average primary particle size of 0.6 µm or less are particularly easily obtained practically.

In addition, the amount of a nucleation agent used is preferably 10 parts by weight or less, more preferably 1 part by weight or less, further preferably 0.5 parts by weight or less, and particularly preferably 0.1 parts by weight or less when the amount of powder of aluminum hydroxide used is 100 parts by weight. As the amount of a nucleation agent used decreases, boehmite particles having large primary particle sizes are easily obtained. In this regard, when the amount of a nucleation agent used with respect to 100 parts by weight of the powder of aluminum hydroxide used is 10 parts by weight or less, or more specifically 1 part by weight or less, 0.5 parts by weight or less, or 0.1 parts by weight or less if the amount of powder of aluminum hydroxide used is 100 parts by weight, boehmite particles having an average primary particle size of 0.01 μm or more are particularly easily obtained practically.

The above described hydrothermal reaction is carried out, for instance, by exposing slurry which is obtained by dispersing or dissolving the powder of aluminum hydroxide and the nucleation agent in water to high temperature and high pressure. An autoclave is suitable for the operation.

The above described slurry contains powder of aluminum hydroxide in an amount of preferably 1% by mass or more, and more preferably 10% by mass or more. As the content of powder of aluminum hydroxide in the slurry increases, the synthesis efficiency of boehmite particles in the hydrothermal reaction increases. In this regard, when the content of powder of aluminum hydroxide in the slurry is 1% by mass or more, or more specifically 10% by mass or more, the synthesis efficiency of boehmite particles in the hydrothermal reaction is easily enhanced up to a level particularly suitable for practical use.

In addition, the slurry contains powder of aluminum hydroxide in an amount of preferably 30% by mass or less, and more preferably 20% by mass or less. As the content of powder of aluminum hydroxide in the slurry decreases, the yield of boehmite particles including primary particles each having a hexahedral shape in the hydrothermal reaction increases. In this regard, when the content of powder of aluminum hydroxide in the slurry is 30% by mass or less, or more specifically 20% by mass or less, the yield of boehmite particles including primary particles each having a hexahedral shape in the hydrothermal reaction is easily enhanced up to a level particularly suitable for practical use.

The slurry has a pH of preferably 8 or lower, more preferably 7 or lower, and further preferably 6 or lower. As the pH of the slurry is lowered, boehmite particles having a small aspect ratio are easily obtained in the hydrothermal reaction. In this regard, when the pH of the slurry is 8 or lower, or more specifically 7 or lower, or 6 or lower, boehmite particles having an aspect ratio of 5 or smaller are particularly easily obtained practically. However, when a reaction container used for the hydrothermal reaction is made of metal, the slurry has a pH preferably 2 or more in order to prevent the corrosion of the reaction container. A method for adjusting the pH of the slurry is not particularly limited, but includes, for instance, an addition of an inorganic acid such as nitric acid to the slurry, ion exchange treatment, decantation, and cross flow filtration with the use of an ultrafiltration membrane. These methods may be used solely or in combination with another method.

The slurry has an electrical conductivity of preferably 500 μS/cm or lower, more preferably 300 μS/cm or lower, further preferably 200 μS/cm or lower, and particularly preferably 100 μS/cm or lower. As the electrical conductivity of the slurry is lowered, boehmite particles having small primary particle sizes becomes easier to obtain in the hydrothermal reaction. In this regard, when the electrical conductivity of the slurry is 500 μS/cm or lower, or more specifically 300 μS/cm or lower, 200 μS/cm or lower, or 100 μS/cm or lower, boehmite particles having an average primary particle size of 0.6 μm or less are particularly easily obtained practically. A method for adjusting the electrical conductivity of the slurry is not particularly limited, but includes, for instance, ion exchange treatment, decantation, and cross flow filtration with the use of an ultrafiltration membrane. These methods may be used solely or in combination with another method.

A temperature of the hydrothermal reaction is preferably 180° C. or higher, more preferably 185° C. or higher, and further preferably 190° C. or higher. As a temperature of the hydrothermal reaction is raised, the synthesis efficiency of boehmite particles in the hydrothermal reaction increases. In this regard, when a temperature of the hydrothermal reaction is 180° C. or higher, or more specifically 185° C. or higher, or 190° C. or higher, the synthesis efficiency of boehmite particles is easily enhanced up to a level particularly suitable for practical use.

In addition, a temperature of the hydrothermal reaction is preferably 300° C. or lower, more preferably 210° C. or lower, and further preferably 205° C. or lower. As a temperature of the hydrothermal reaction is lowered, boehmite particles having uniform primary particle sizes are easily obtained in the hydrothermal reaction. In this regard, when a temperature of the hydrothermal reaction is 300° C. or lower, or more specifically 210° C. or lower, or 205° C. or lower, boehmite particles having uniform primary particle sizes are particularly easily obtained practically.

A pressure of the hydrothermal reaction is not particularly limited. Boehmite particles can be favorably obtained by using an autogenous pressure, but an increased pressure or a reduced pressure may be employed, as needed.

A period of time for the hydrothermal reaction is not particularly limited, but it is difficult to obtain a sufficient amount of boehmite particles in an excessively short period of time. A preferable period of time for the hydrothermal reaction is, for instance, 8 hours or longer when a temperature of the hydrothermal reaction is 180° C., 6 hours or longer when a temperature of the hydrothermal reaction is 190° C., 4 hours or longer when a temperature of the hydrothermal reaction is 195° C., and 3 hours or longer when a temperature of the hydrothermal reaction is 200° C.

Boehmite particles obtained in the hydrothermal reaction are preferably cleaned. Powder of aluminum hydroxide often contains sodium ions as impurities, so that the sodium ions will remain also in boehmite particles as impurities, which are synthesized through a hydrothermal reaction with the use of such powder of aluminum hydroxide as a raw material. Impurity sodium ions in boehmite particles is not desirable, depending on an application of the boehmite particles. Accordingly, boehmite particles obtained in the hydrothermal reaction are cleaned when the sodium ions contained in the boehmite particles needs to be removed. A typical method for cleaning boehmite particles includes, for instance, methods of using a rotary filter, and cross flow filtration with the use of an ultrafiltration membrane. In these methods, boehmite particles are cleaned by collecting, as filtrate, a water phase in slurry containing the boehmite particles while introducing pure water in the slurry.

The amount of sodium ions which are contained in boehmite particles as impurities is positively correlated to the electrical conductivity which is measured for filtrate collected in a process of cleaning the boehmite particles. Accordingly, the electrical conductivity of filtrate collected in a process of cleaning boehmite particles can be an indicator for the amount of impurity sodium ions in the boehmite particles. Boehmite particles which are assumed to be used as a raw material for alumina particles are cleaned until the electrical conductivity of filtrate collected in the cleaning process becomes preferably 50 μS/cm or lower, more preferably becomes 40 μS/cm or lower, and further preferably becomes 20 μS/cm or lower. As the value of the electrical conductivity of filtrate collected in the cleaning process is smaller, the alpha ratio of alumina particles obtained by calcining the boehmite particle is easily controlled. In this regard, when boehmite particles are cleaned until the electrical conductivity of filtrate collected in the cleaning process becomes 50 μS/cm or lower, or more specifically 40 μS/cm or lower, or 20 μS/cm or lower, the controllability for the alpha ratio of alumina particles can be enhanced up to a level particularly suitable for practical use.

Next, before a method for producing alumina particles according to the present embodiment will be described, alumina particles produced by the method according to the present embodiment will now be described. The main application of alumina particles produced by the method according to the present embodiment is to be used as abrasive grains.

Alumina particles produced by the method according to the present embodiment include primary particles preferably each having a hexahedral shape. For that matter, each primary particle of the alumina particles particularly preferably has an outer shape similar to a parallelepiped defined by two square surfaces that face each other and four rectangular or square surfaces, or a parallelepiped defined by two rhombic surfaces that face each other and four rectangular or square surfaces. Alumina particles including primary particles each having a hexahedral shape are suitable as abrasive grains in an application of polishing an object to be polished so as to obtain a polished surface with high smoothness and few defects. The shapes of the primary particles of alumina particles obtained by calcining boehmite particles usually inherit the almost shapes of the primary particles of the boehmite particles, so that in order to obtain alumina particles including primary particles each having a desired shape, boehmite particles including primary particles each having the same shape as the desired shape may be calcined.

The primary particles of alumina particles produced by the method according to the present embodiment have an average particle size of preferably 0.6 μm or less, more preferably 0.4 μm or less, further preferably 0.3 μm or less, and particularly preferably 0.2 μm or less. In other words, alumina particles produced by the method according to the present embodiment have an average primary particle size of preferably 0.6 μm or less, more preferably 0.4 μm or less, further preferably 0.3 μm or less, and particularly preferably 0.2 μm or less. The average primary particle size of alumina particles including primary particles each having a hexahedral shape is defined as an average length of sides each of which is the longest among three sides extending from one vertex of each primary particle of the alumina particles. Alumina particles having an average primary particle size in any of the above described ranges are suitable as abrasive grains in an application of polishing an object to be polished so as to obtain a polished surface with high smoothness and few defects. The value of the average primary particle size of alumina particles obtained by calcining boehmite particles usually inherits the almost value of the average primary particle size of the boehmite particles, so that in order to obtain alumina particles having a desired average primary particle size, boehmite particles having the same average primary particle size as the desired average primary particle size may be calcined.

In addition, the average primary particle size of alumina particles produced by the method according to the present embodiment is preferably 0.01 μm or more, more preferably 0.05 μm or more, further preferably 0.08 μm or more, and particularly preferably 0.1 μm or more. As the average primary particle size of alumina particles is larger, the removal rate by the alumina particles against an object to be polished is enhanced. In this regard, when the average primary particle size of alumina particles is 0.01 μm or more, or more specifically 0.05 μm or more, 0.08 μm or more, or 0.1 μm or more, the removal rate is easily enhanced up to a level particularly suitable for practical use.

When the primary particles of alumina particles produced by the method according to the present embodiment each have a hexahedral shape, the primary particles have an aspect ratio preferably in a range of 1 to 5, more preferably of 1 to 3, further preferably of 1 to 2, and particularly preferably of 1 to 1.5. The aspect ratio of alumina primary particles each having a hexahedral shape is defined as an average of values each obtained by dividing a by c, where the length of the longest side is represented by a and that of the shortest side is represented by c among three sides extending from one vertex of each alumina primary particle. The length of the remaining one side b of each alumina primary particle is preferably approximately equal to that of the longest side a of the alumina primary particle. Alumina particles including primary particles having an aspect ratio of 1 to 5, more specifically 1 to 3, 1 to 2, or 1 to 1.5 are particularly suitable as abrasive grains in an application of polishing an object to be polished so as to obtain a polished surface with high smoothness and few defects. The aspect ratio of the primary particles of alumina particles obtained by calcining boehmite particles usually inherits the almost aspect ratio of the primary particles of the boehmite particles, so that in order to obtain alumina particles including primary particles having a desired aspect ratio, boehmite particles including primary particles having the same aspect ratio as the desired aspect ration may be calcined.

Alumina particles produced by the method according to the present embodiment have an average secondary particle size preferably in a range of 0.08 to 2 μm, more preferably 0.15 to 1 μm, and further preferably 0.2 to 0.7 μm. The average secondary particle size of alumina particles is equal to the particle size of the last cumulative particle when the cumulative volume of particles in order from the smallest particle measured by a laser scattering method becomes 50% or more of the total volume of all the alumina particles. Alumina particles having an average secondary particle size in a range of 0.08 to 2 μm, or more specifically 0.15 to 1 μm, or 0.2 to 0.7 μm are particularly suitable as abrasive grains in an application of polishing an object to be polished so as to obtain a surface to be polished with high smoothness and few defects.

A value D90/D10 obtained by dividing the 90% particle size (D90) of alumina particles produced by the method according to the present embodiment by the 10% particle size (D10) of the same alumina particles, which is an indicator of the particle size distribution of the alumina particles, is preferably in a range of 1.2 to 3, more preferably of 1.5 to 2.5, and further preferably of 1.8 to 2.2. The 90% particle size of alumina particles is equal to the particle size of the last cumulative particle when the cumulative volume of particles in order from the smallest particle measured by a laser scattering method becomes 90% or more of the total volume of all the alumina particles. The 10% particle size of alumina particles is equal to the particle size of the last cumulative particle when the cumulative volume of particles in order from the smallest particle measured by a laser scattering method becomes 10% or more of the total volume of all the alumina particles. Alumina particles having a value D90/D10 in a range of 1.2 to 3, or more specifically 1.5 to 2.5, or 1.8 to 2.2 are particularly suitable as abrasive grains in an application for polishing an object to be polished so as to obtain a polished surface with high smoothness and few defects.

Alumina particles produced by the method according to the present embodiment may have any crystal form, and may mainly contain any one of, for instance, a transition alumina such as γ-alumina, δ-alumina, and θ-alumina, and α-alumina. However, when high hardness is required, the alumina particles preferably include α-alumina at least in a part. The alpha ratio of the alumina particles is preferably 5 to 70%, more preferably 10 to 60%, and particularly preferably 20 to 50%. The alpha ratio is a value determined by an X-ray diffraction method based on a comparison result with corundum. Alumina particles having an alpha ratio in a range of 5 to 70%, or more specifically 10 to 60%, or 20 to 50% are particularly suitable as abrasive grains in an application for polishing an object to be polished so as to obtain a polished surface with high smoothness and few defects.

In a method for producing alumina particles according to the present embodiment, boehmite particles obtained through the above described hydrothermal reaction are used as a starting material. The boehmite particles are preferably previously cleaned, but are not necessarily cleaned previously.

Boehmite particles obtained through the hydrothermal reaction are dried at first after having been cleaned or without being cleaned. A typical method for drying boehmite particles includes a flash drying method.

The boehmite particles after having been dried are subsequently calcined, and as a result, alumina particles are obtained.

The calcination temperature is preferably 500° C. or higher, more preferably 800° C. or higher, further preferably 1,000° C. or higher, and particularly preferably 1,030° C. or higher. As the calcination temperature is raised, alumina particles having a high alpha ratio are easily obtained. In this regard, when the calcination temperature is 500° C. or higher, or more specifically 800° C. or higher, 1,000° C. or higher, or 1,030° C. or higher, alumina particles having an alpha ratio of 20% or more is particularly easily obtained practically.

In addition, the calcination temperature is preferably 1,200° C. or lower, more preferably 1,100° C. or lower, and further preferably 1,070° C. or lower. As the calcination temperature is lowered, the yield of alumina particles including primary particles each having a hexahedral shape increases. In this regard, when the calcination temperature is 1,200° C. or lower, or more specifically 1,100° C. or lower, or 1,070° C. or lower, the yield of alumina particles including primary particles each having a hexahedral shape is easily enhanced up to a level particularly suitable for practical use.

Alumina particles obtained by calcining the boehmite particles are then disintegrated. At least some of secondary particles which are formed of some agglomerating primary particles by the disintegration are divided into a plurality of particles of which the smallest unit is the primary particles. A typical method for disintegrating alumina particles includes a media mill method with the use of balls or beads and a jet mill method.

The disintegrated alumina particles are preferably subjected to treatment for removing coarse particles contained in the alumina particles therefrom. A typical method for removing coarse particles in alumina particles includes elutriation classification in which the coarse particles is removed by dispersing the alumina particles in water and naturally settling down the coarse particles, and a method of removing the coarse particles by passing the alumina particles through a filter.

The boehmite particles obtained in this way have primary particles having almost the same shape as that of the primary particles of the boehmite particles which are used as a raw material.

The present embodiment provides the following advantages.

According to the method for producing boehmite particles of the present embodiment, boehmite particles having an average primary particle size of 0.6 μm or less and including primary particles each having a hexahedral shape are obtained, by subjecting powder of aluminum hydroxide to hydrothermal reaction together with a nucleation agent. In addition, according to the method for producing alumina particles of the present embodiment, alumina particles having an average primary particle size of 0.6 μm or less and including primary particles each having a hexahedral shape are obtained, by using the boehmite particles as a starting material, and making the boehmite particles pass through at least steps of drying, calcination, and disintegration. The alumina particles are suitable as abrasive grains in an application of polishing an object to be polished so as to obtain a polished surface with high smoothness and few defects. The boehmite particles obtained by the method for producing boehmite particles according to the present embodiment is useful at least as a raw material for such alumina particles.

Next, the present invention will be described more specifically with reference to Examples and Comparative Examples.

Example 1

Slurry was prepared by dispersing 80 g of gibbsite powder and 0.4 g of alumina sol into 720 g of pure water. The obtained slurry was stirred at a rotation speed of 8,000 rpm for 20 minutes, and then was transferred into an autoclave. The autoclave was heated to the temperature of 200° C. at a heating rate of 1.5° C./minute, and was held at 200° C. for 4 hours. Afterwards, the autoclave was naturally cooled to room temperature, and then, the slurry which had finished the hydrothermal reaction and contained boehmite particles synthesized through the reaction was taken out from the autoclave. The boehmite particles were cleaned by collecting, as filtrate, a water phase in the slurry which had finished the reaction, while introducing pure water into the slurry, until the electrical conductivity of the collected filtrate reached 20 μS/cm or lower.

Example 2

A mixture of 80 g of gibbsite powder and 720 g of pure water was subjected to cross flow filtration with the use of an ultrafiltration membrane to adjust the electrical conductivity to 50 μS/cm. Afterwards, 0.4 g of alumina sol was added to the mixture, and nitric acid was further added thereto to adjust the pH to 6.0. Except that the slurry obtained in this way was used in place of the slurry in Example 1, boehmite particles were produced according to similar procedures to those in Example 1.

Example 3

A mixture of 80 g of gibbsite powder and 720 g of pure water was subjected to cross flow filtration with the use of an ultrafiltration membrane to adjust the electrical conductivity to 50 μS/cm. Afterwards, 0.4 g of alumina sol was added to the mixture, and sodium nitrate was further added thereto until the electrical conductivity reached 2,400 μS/cm. Except that the slurry obtained in this way was used in place of the slurry in Example 1, boehmite particles were produced according to similar procedures to those in Example 1.

Example 4

A mixture of 80 g of gibbsite powder and 720 g of pure water was subjected to cross flow filtration with the use of an ultrafiltration membrane to adjust the electrical conductivity to 50 μS/cm. Afterwards, 1.6 g of alumina sol was added to the mixture, and nitric acid was further added thereto to adjust the pH to 4.8. Except that the slurry obtained in this way was used in place of the slurry in Example 1, boehmite particles were produced according to similar procedures to those in Example 1.

Example 5

A mixture of 80 g of gibbsite powder and 720 g of pure water was subjected to cross flow filtration with the use of an ultrafiltration membrane to adjust the electrical conductivity to 50 μS/cm. Afterwards, 1.6 g of alumina sol was added to the mixture, and nitric acid was further added thereto to adjust the pH to 4.0. Except that the slurry obtained in this way was used in place of the slurry in Example 1, boehmite particles were produced according to similar procedures to those in Example 1.

Physical properties (average primary particle size, average secondary particle size, and aspect ratio) of the boehmite particles which were obtained in the above described Examples 1 to 5 are shown in Table 1 together with the values of the electrical conductivity and pH of the slurry prior to being subjected to the hydrothermal reaction.

TABLE 1

|  | Electrical conductivity of slurry [μS/cm] | pH of slurry | Average primary particle size of boehmite particles [μm] | Average secondary particle size of boehmite particles [μm] | Aspect ratio of boehmite particles |
| --- | --- | --- | --- | --- | --- |
| Example 1 | 400 | 9.5 | 0.160 | 0.167 | 3.0 |
| Example 2 | 120 | 6.0 | 0.115 | 0.124 | 1.5 |
| Example 3 | 2,400 | 7.1 | 0.140 | 0.150 | 5.0 |
| Example 4 | 160 | 4.8 | 0.095 | 0.111 | 2.0 |
| Example 5 | 160 | 4.0 | 0.085 | 0.108 | 1.5 |

Example 6

Slurry was prepared by dispersing 120 g of gibbsite powder and 1.2 mg of alumina sol into 680 g of pure water. The slurry was stirred at a rotation speed of 8,000 rpm for 20 minutes, and then was transferred into an autoclave. The autoclave was heated to the temperature of 200° C. at a heating rate of 1.5° C./minute, and was held at 200° C. for 4 hours. Afterwards, the autoclave was naturally cooled to room temperature, and then, the slurry which had finished the hydrothermal reaction and contained boehmite particles synthesized through the reaction was taken out from the autoclave. The boehmite particles were cleaned by collecting, as filtrate, a water phase in the slurry which had finished the reaction, while introducing pure water into the slurry, until the electrical conductivity of the collected filtrate reached 20 μS/cm or lower. The boehmite particles after having been cleaned were flash-dried, and then were calcined in a calcination furnace to obtain alumina particles. In the calcining step, the calcination furnace was heated to the temperature of 1,050° C. at a heating rate of 2° C./minute, and was held at 1,050° C. for 3 hours. The obtained alumina particles were disintegrated by using a jet mill at a disintegration pressure of 0.6 MPa. Finally, coarse particles having sizes of 2 μm or more were removed by elutriation classification.

Example 7

Except that the amount of alumina sol to be added was changed from 1.2 mg to 4.8 mg, alumina particles were produced according to similar procedures to those in Example 6.

Example 8

Except that the amount of alumina sol to be added was changed from 1.2 mg to 24 mg, alumina particles were produced according to similar procedures to those in Example 6.

Example 9

Except that the amount of alumina sol to be added was changed from 1.2 mg to 60 mg, alumina particles were produced according to similar procedures to those in Example 6.

Examples 10 and 11

Except that the amount of alumina sol to be added was changed from 1.2 mg to 240 mg, and the electrical conductivity and pH of the slurry prior to being subjected to hydrothermal reaction were adjusted to 150 μS/cm and 7.0, respectively, through cross flow filtration with the use of an ultrafiltration membrane, and the calcination temperature was changed from 1050° C., alumina particles were produced according to similar procedures to those in Example 6. The calcination temperature was 1030° C. in Example 10, and 1040° C. in Example 11.

Example 12

Except that the amount of alumina sol to be added was changed from 1.2 mg to 240 mg and the electrical conductivity and pH of the slurry prior to being subjected to hydrothermal reaction were adjusted to 150 μS/cm and 7.0, respectively, through cross flow filtration with the use of an ultrafiltration membrane, alumina particles were produced according to similar procedures to those in Example 6.

Example 13

Except that 120 mg of aluminum nitrate nonahydrate was used in place of the alumina sol, alumina particles were produced according to similar procedures to those in Example 6.

Comparative Example 1

Except that 12 mg of aluminum nitrate nonahydrate was used in place of the alumina sol, alumina particles were produced according to similar procedures to those in Example 6.

Comparative Example 2

Except that 240 mg of aluminum nitrate nonahydrate was used in place of the alumina sol, alumina particles were produced according to similar procedures to those in Example 6.

Comparative Example 3

Except that 120 mg of ferric chloride was used in place of the alumina sol, alumina particles were produced according to similar procedures to those in Example 6.

Comparative Example 4

Except that the addition of the alumina sol was omitted, alumina particles were produced according to similar procedures to those in Example 6.

Comparative Example 5

Slurry having alumina particles dispersed in pure water was prepared by charging 1.2 kg of alumina particles having an average particle size of 50 μm into 1.5 kg of pure water together with a dispersing agent. This slurry was charged into a pot of a pot mill together with 6 kg of alumina balls having a diameter of 8 mm, and the alumina particles were pulverized by rotating the pot mill at a rotation speed of 70 rpm for 30 hours.

Comparative Example 6

Except that a rotation period of time of a pot mill was changed from 30 hours to 60 hours, alumina particles having an average particle size of 50 μm were pulverized according to similar procedures to those in Comparative Example 5.

The type and the content of a nucleation agent used in each of Examples 6 to 13 and Comparative Examples 1 to 6 are shown in Table 2. The results of having measured the aspect ratio, the alpha ratio, the average primary particle size, and the average secondary particle size of the alumina particles which were finally obtained in each of Examples 6 to 13 and Comparative Examples 1 to 6 are also shown in Table 2.

A polishing composition was prepared by mixing the alumina particles which were finally obtained in each of Examples 6 to 13 and Comparative Examples 1 to 6 in water together with aluminum nitrate nonahydrate (polishing accelerator), tetrasodium glutamate diacetate (cleaning accelerator), and hydrogen peroxide (oxidizing agent). In the case of any polishing composition, the content of alumina particles was 1.5% by mass, the content of aluminum nitrate nonahydrate was 3 g/L, the content of tetrasodium glutamate diacetate was 0.3 g/L, and the content of hydrogen peroxide was 13 g/L.

The surface of an electroless nickel-phosphorus plated substrate for a magnetic disk having a diameter of 3.5 inches (≈95 mm) was polished by using each of the polishing compositions in conditions shown in Table 3, and a polishing rate at this time was determined on the basis of the difference between weights of the substrate before and after polishing. The result is shown in the column of "polishing rate" in Table 2.

The number of scratches was measured which existed on the surface of the substrate that was polished by using each of the polishing compositions and then was rinsed with pure water. Specifically, the number of the scratches was visually measured while irradiating the surface of each substrate with a light emitted from a surface inspection lamp "F100Z" made by FUNAKOSHI YAKUHIN KK. The measurement results were evaluated to be excellent (∘∘) when the number of the measured scratches was less than 25, to be good (∘) when the number was 25 or more but less than 50, to be slightly poor (×) when the number was 50 or more but less than 75, to be poor (××) when the number was 75 or more but less than 100, and to be extremely poor (×××) when the number was 100 or more. The evaluation result is shown in the column of "number of scratches" in Table 2.

The surface of the substrate was visually observed under a fluorescent lamp, after being polished by using each of the polishing compositions and then rinsed with pure water, and the presence or absence of the deposition of alumina particles on the surface of the substrate was checked. The observation results were evaluated to be good (∘) when the deposition of alumina particles was not confirmed, and to be poor (×) when the deposition of alumina particles was confirmed. The evaluation result is shown in the column of "ease of washing off" in Table 2.

TABLE 2

| | Nucleation agent | | Aspect ratio | Alpha ratio [%] | Average primary particle size [μm] | Average secondary particle size [μm] | Polishing rate [μm/minute] | Number of scratches | Ease of washing off |
|---|---|---|---|---|---|---|---|---|---|
| | Type | Content [mg] | | | | | | | |
| Example 6 | Alumina sol | 1.2 | 1.0 | 40 | 0.6 | 1.1 | 0.85 | ∘ | ∘ |
| Example 7 | Alumina sol | 4.8 | 1.2 | 40 | 0.4 | 0.6 | 0.79 | ∘ | ∘ |
| Example 8 | Alumina sol | 24 | 1.5 | 40 | 0.3 | 0.38 | 0.67 | ∘∘ | ∘ |
| Example 9 | Alumina sol | 60 | 1.6 | 40 | 0.2 | 0.3 | 0.48 | ∘∘ | ∘ |
| Example 10 | Alumina sol | 240 | 2.5 | 5 | 0.15 | 0.21 | 0.40 | ∘∘ | ∘ |
| Example 11 | Alumina sol | 240 | 2.5 | 10 | 0.15 | 0.21 | 0.42 | ∘∘ | ∘ |
| Example 12 | Alumina sol | 240 | 2.5 | 15 | 0.15 | 0.21 | 0.43 | ∘∘ | ∘ |

TABLE 2-continued

| | Nucleation agent | | Aspect ratio | Alpha ratio [%] | Average primary particle size [μm] | Average secondary particle size [μm] | Polishing rate [μm/minute] | Number of scratches | Ease of washing off |
|---|---|---|---|---|---|---|---|---|---|
| | Type | Content [mg] | | | | | | | |
| Example 13 | Aluminum nitrate | 120 | 1.2 | 40 | 0.4 | 0.7 | 0.80 | ○ | ○ |
| Comparative example 1 | Aluminum nitrate | 12 | 1.1 | 40 | 0.75 | 1.3 | 0.87 | x | ○ |
| Comparative example 2 | Aluminum nitrate | 240 | 30 | 40 | 0.9 | 1.3 | 0.20 | xx | ○ |
| Comparative example 3 | Ferric chloride | 120 | 30 | 40 | 1.0 | 1.5 | 0.20 | xx | ○ |
| Comparative example 4 | None | — | 1.0 | 40 | 0.7 | 1.3 | 0.90 | xx | ○ |
| Comparative example 5 | — | — | — | 20 | 0.2 | 0.8 | 0.65 | xxx | x |
| Comparative example 6 | — | — | — | 20 | 0.2 | 0.6 | 0.42 | x | x |

TABLE 3

Polishing machine: double-sided polishing machine ("9.5B-5P" made by System Seiko Co., Ltd.)
Polishing pad: polyurethane pad ("CR200" made by FILWEL Co., Ltd.)
Polishing load: 100 g/cm$^2$ (≈10 kPa)
Rotation speed of upper table: 24 rpm
Rotation speed of lower table: 16 rpm
Amount of polishing composition to be supplied: 150 mL/minute
Amount to be polished: 3 μm by thickness From the results shown in Table 1, it was found that the values of the electrical conductivity and pH of the slurry before being subjected to hydrothermal reaction exerted an influence upon physical properties of the obtained boehmite particles.

From the results shown in Table 2, it was found that when alumina sol or aluminum nitrate was used as a nucleation agent, and particularly when alumina sol was used, alumina particles having a comparatively small average primary particle size were easily obtained. The alumina particles which were obtained in Comparative Examples 5 and 6 had a comparatively small average primary particle size, but the evaluation relating to scratches and the evaluation relating to washing were not adequate. This is considered to be because each primary particle of the alumina particles does not have a hexahedral shape.

The invention claimed is:

1. A method for producing boehmite particles, comprising subjecting powder of gibsite to hydrothermal reaction together with a nucleation agent, thereby obtaining boehmite particles having an average primary particle size of 0.6 μm or less and including primary particles each having a hexahedral shape, wherein the primary particles have an average aspect ratio of 1 to 5, the average aspect ratio being defined as an average of values each obtained by dividing a by c, where the length of the longest side is represented by a and the length of the shortest side is represented by c among three sides extending from one vertex of each primary particle, and wherein the nucleation agent is an aluminum salt or sol of metal oxide.

2. The method according to claim 1, wherein the step of subjecting powder of aluminum hydroxide to hydrothermal reaction together with a nucleation agent is performed by subjecting slurry containing the powder of aluminum hydroxide and the nucleation agent to the hydrothermal reaction, the slurry having a pH of 8 or lower.

3. The method according to claim 1, wherein the step of subjecting powder of aluminum hydroxide to hydrothermal reaction together with a nucleation agent is performed by subjecting slurry containing the powder of aluminum hydroxide and the nucleation agent to the hydrothermal reaction, the slurry having an electrical conductivity of 500 μS/cm or lower.

4. The method according to claim 1, further comprising a step of collecting, as filtrate, a water phase in slurry obtained as a result of the hydrothermal reaction and containing the boehmite particles while introducing pure water into the slurry and until the electrical conductivity of the collected filtrate becomes 50 μS/cm or lower.

5. A method for producing alumina particles, comprising:
drying boehmite particles produced by subjecting powder of gibbsite to hydrothermal reaction together with a nucleation agent, the boehmite particles having an average primary particle size of 0.6 μm or less and including primary particles each having a hexahedral shape, wherein the primary particles have an average aspect ratio of 1 to 5, the average aspect ratio being defined as an average of values each obtained by dividing a by c, where the length of the longest side is represented by a and the length of the shortest side is represented by c among three sides extending from one vertex of each primary particle, and wherein the nucleation agent is an aluminum salt or sol of metal oxide;
calcining the boehmite particles, which have been dried, to obtain alumina particles; and
disintegrating the obtained alumina particles.

6. The method according to claim 1, wherein the nucleation agent is alumina sol.

7. The method according to claim 1, wherein the nucleation agent is aluminum nitrate.

8. The method according to claim 1, wherein the average aspect ratio of the primary particles is 1 to 2.5.

9. The method according to claim 6, wherein the alumina sol has an average particle size of 5 to 15 nm.

10. The method according to claim 6, wherein the alumina sol has a largest particle size of 200 nm or less.

11. The method according to claim 1, wherein the nucleation agent is used in the hydrothermal reaction in an amount of 0.1 parts by weight or less with respect to 100 parts by weight of the powder of gibbsite.

12. The method according to claim 2, wherein the slurry has a pH of 6 or lower.

13. The method according to claim 3, wherein the slurry has an electrical conductivity of 160 μS/cm or lower.

* * * * *